United States Patent
Otsuka

(10) Patent No.: US 10,821,876 B2
(45) Date of Patent: Nov. 3, 2020

(54) VEHICULAR LAMP

(71) Applicant: STANLEY ELECTRIC CO., LTD., Tokyo (JP)

(72) Inventor: Fumiya Otsuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/418,656

(22) Filed: May 21, 2019

(65) Prior Publication Data

US 2019/0359115 A1 Nov. 28, 2019

(30) Foreign Application Priority Data

May 22, 2018 (JP) ................. 2018-097753

(51) Int. Cl.
*B60Q 1/00* (2006.01)
*F21S 45/10* (2018.01)
*F21V 29/10* (2015.01)
*F21S 41/141* (2018.01)

(52) U.S. Cl.
CPC .............. *B60Q 1/007* (2013.01); *F21S 45/10* (2018.01); *F21S 41/141* (2018.01); *F21V 29/10* (2015.01)

(58) Field of Classification Search
None
See application file for complete search history.

(56) References Cited

U.S. PATENT DOCUMENTS

| | | | | |
|---|---|---|---|---|
| 5,562,339 A | * | 10/1996 | Tanaka ................... | B60Q 1/007 362/519 |
| 2008/0266892 A1 | * | 10/2008 | Yashiki .................. | B60Q 1/007 362/546 |
| 2015/0103552 A1 | * | 4/2015 | Aiso ....................... | F21S 45/48 362/549 |

FOREIGN PATENT DOCUMENTS

| | | |
|---|---|---|
| DE | 31 32 440 A1 | 2/1983 |
| DE | 694 22 355 T2 | 7/2000 |
| DE | 100 10 624 A1 | 9/2000 |
| JP | 2009-539213 A | 11/2009 |
| JP | 2014-89877 A | 5/2014 |
| KR | 1998-031091 U | 8/1998 |
| KR | 10-2013-0134543 A | 12/2013 |
| WO | 2007/141232 A1 | 12/2007 |
| WO | 2014/009017 A1 | 1/2014 |

OTHER PUBLICATIONS

The extended European Search Report for the related European Patent Application No. 19175811.9 dated Jul. 24, 2019.

* cited by examiner

*Primary Examiner* — Elmito Breval
(74) *Attorney, Agent, or Firm* — Kenealy Vaidya LLP

(57) ABSTRACT

A vehicular lamp includes: a light source unit; a housing inside of which the light source unit is disposed and which has a work hole formed therein on a rear side thereof; and a cover member detachably attached to the work hole of the housing. The cover member includes a cover main body configured to close the work hole, a recess portion formed by concaving an outer surface of the cover main body, and a protrusion portion protruding from an inner surface of the cover main body corresponding to the recess portion, and the protrusion portion forms an inclined surface inclined in a diameter-expanding direction from an inner circumferential side toward an outer circumferential side of the cover main body when the cover main body is viewed in a cross-sectional view in an axial direction.

19 Claims, 2 Drawing Sheets

VEHICULAR LAMP

This application claims the priority benefit under 35 U.S.C. § 119 of Japanese Patent Application No. 2018-097753 filed on May 22, 2018, which is hereby incorporated in its entirety by reference.

TECHNICAL FIELD

The presently disclosed subject matter relates to a vehicular lamp.

BACKGROUND ART

Conventionally, there has been a known vehicular lamp in which a light source unit is disposed inside a lamp body composed of a housing having a front surface with an opening and a lens cover configured to cover the opening of the housing. In such a vehicular lamp, a work hole is provided on the rear surface of the housing, and a cover member is detachably attached to the work hole to seal the hole. Thus, it is possible to replace the light source unit and route wiring cord, and the like through the work hole (see, for example, JP2009-539213A (WO2007/141232A1) and JP2014-89877A).

Incidentally, the cover member described in JP2009-539213A has a plurality of claw portions serving as retainers for preventing the cover member from falling off the work hole, and the cover member can be rotated in a peripheral direction while the front face of the cover member is fit to the work hole, so that the cover member can be attached to the work hole.

However, in the cover member disclosed in JP2009-539213A, since there is no portion for gripping the cover member, it is difficult to rotate, and there is a problem that the attachment/detachment operation of the cover member becomes difficult unless a sufficient space is secured on the back surface side of the cover member.

On the other hand, the cover member described in JP2014-89877A has a configuration in which a desiccant is disposed inside the cover member. However, when the desiccant is disposed inside the cover member, the space for routing the wiring cord described above cannot be secured, and the wiring cord may interfere with the inside of the cover member.

SUMMARY

The presently disclosed subject matter was devised in view of these and other problems and features in association with the conventional art. According to an aspect of the presently disclosed subject matter, there can be provided a vehicular lamp which can easily attach and detach a cover member and can prevent interference between an inner portion of the cover member and a wiring cord or the like.

According to another aspect of the presently disclosed subject matter, there can be provide a vehicular lamp including: a light source unit; a housing inside of which the light source unit is disposed and which has a work hole formed therein on a rear side thereof; and a cover member detachably attached to the work hole of the housing, wherein the cover member includes a cover main body configured to close the work hole, a recess portion formed by concaving an outer surface of the cover main body, and a protrusion portion protruding from an inner surface of the cover main body corresponding to the recess portion, and the protrusion portion forms an inclined surface inclined in a diameter-expanding direction from an inner circumferential side toward an outer circumferential side of the cover main body when the cover main body is viewed in a cross-sectional view in an axial direction.

Furthermore, the vehicular lamp with the foregoing configuration may be configured such that the protrusion portion forms a convex surface curved from the outer circumferential side toward the inner circumferential side of the cover main body when the inner surface of the cover main body is viewed in plan view.

Furthermore, the vehicular lamp with the foregoing configuration may be configured such that the cover main body has a top wall portion facing the work hole and a peripheral wall portion surrounding a periphery of the top wall portion, and the recess portion and the protrusion portion are provided on the peripheral wall portion.

Furthermore, the vehicular lamp with the foregoing configuration may be configured such that a plurality of the recess portions and a plurality of the protrusion portions are arranged side by side in a circumferential direction of the peripheral wall portion.

Furthermore, the vehicular lamp with the foregoing configuration may be configured such that the recess portion is a gripping portion that allows one to grip the cover member.

Furthermore, the vehicular lamp with the foregoing configuration may be configured such that the cover main body includes a flange portion protruding from the periphery of the peripheral wall portion in the diameter-expanding direction, and a front cylindrical portion positioned forward of the flange portion of the peripheral wall portion and fitted into the work hole, and a plurality of claw portions serving as retainers for preventing the cover member from falling off the work hole are provided circumferentially side by side on the periphery of the front cylindrical portion.

As described above, according to the presently disclosed subject matter, it is possible to provide a vehicular lamp capable of allowing one to easily perform the attaching/detaching operation of the cover member and of preventing interference between the inside of the cover member and the wiring cord.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
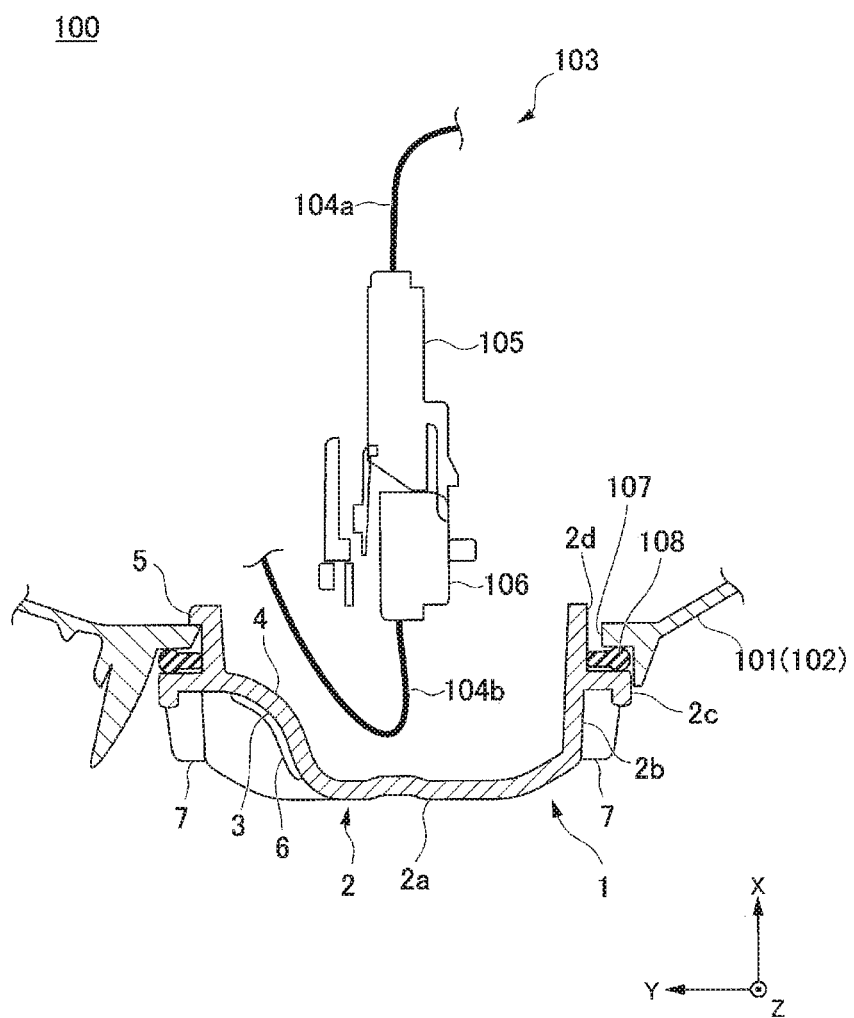
FIG. 1 is a cross-sectional view showing a configuration example of a vehicular lamp provided with a cover member according to an embodiment made in accordance with principles of the presently disclosed subject matter.

A description will now be made below to a vehicular lamp of the presently disclosed subject matter with reference to the accompanying drawings in accordance with exemplary embodiments.

In the drawings used in the following description, in order to make each component easy to see, the scale of the dimension may be shown differently depending on the component, and the dimensional ratio of each component is not necessarily the same as the actual ratio.

As one exemplary embodiment of the presently disclosed subject matter, a vehicular lamp 100 having a cover member 1 shown in FIGS. 1 to 3, for example, will be described.

FIG. 1 is a cross-sectional view showing a configuration example of a vehicular lamp 100 including a cover member 1. FIG. 2 is a perspective view of the cover member 1 as viewed from the outer surface side. FIG. 3 is a perspective view of the cover member 1 as viewed from the inner surface side.

In the drawings shown below, the XYZ orthogonal coordinate system is set, and the X-axis direction is indicated as the front-rear direction (length direction) of the vehicular lamp 100, the Y-axis direction is indicated as the left-right direction (width direction) of the vehicular lamp 100, and the Z-axis direction is indicated as the vertical direction (height direction) of the vehicular lamp 100.

In the vehicular lamp 1 of the present exemplary embodiment, for example, the present invention is applied to a vehicular headlamp to be mounted on both corner portions on the front end side of a vehicle body (not shown).

Specifically, as shown in FIG. 1, the vehicular lamp 100 has a structure in which a light source unit 103 configured to project light toward the front of the vehicle body (+X-axis direction) is disposed inside a lamp body 102 composed of a housing 101 having a front surface with an opening and a transparent lens cover (not shown) covering the opening of the housing 101.

The light source unit 103 may adopt a light-emitting diode (LED) that emits white light as a light source (not shown). In the light source unit 103, a mounting board (not shown) on which LEDs are mounted and a circuit board (not shown) on which a driving circuit for driving LEDs is provided are separately disposed inside the lamp body 102, and these mounting board and circuit board are electrically connected via wiring cords 104a and 104b, thereby protecting the driving circuit from heat generated by the LEDs.

In the light source unit 103, a plug 105 attached to the wiring cord 104a on the mounting board side is inserted into a socket 106 attached to the wiring cord 104b on the circuit board side, thereby electrically connecting the mounting board and the circuit board.

In the vehicular lamp 100 of the present exemplary embodiment, the plug 105 is inserted into the socket 106 through a substantially circular work hole 107 provided on the rear surface side of the housing 101.

The vehicular lamp 100 of the present exemplary embodiment includes a cover member 1 detachably attached to the work hole 107 in order to seal the work hole 107 after the plug 105 has been inserted into the socket 106.

Figure 2:
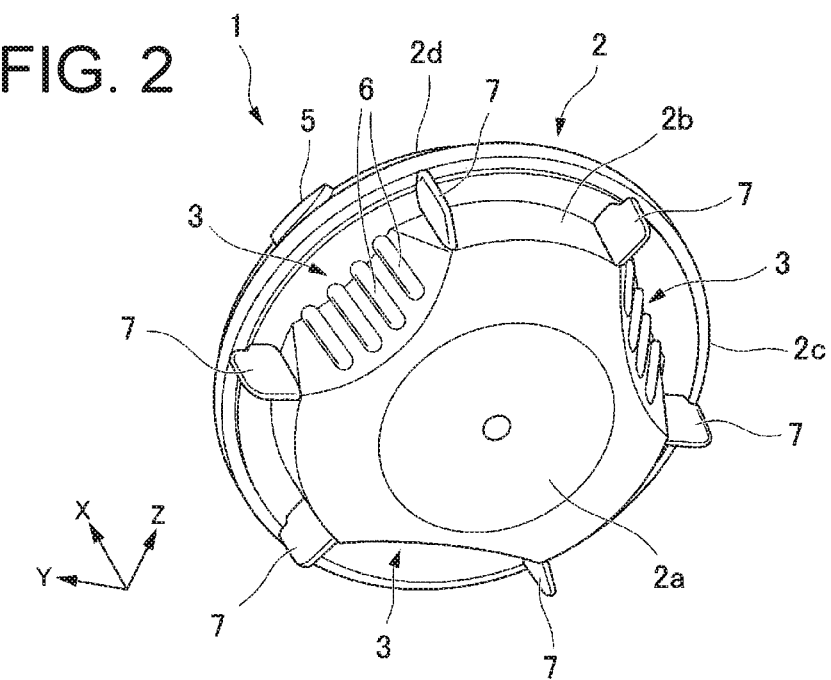
FIG. 2 is a perspective view of the cover member shown in FIG. 1 as viewed from the outer surface side.
Figure 3:
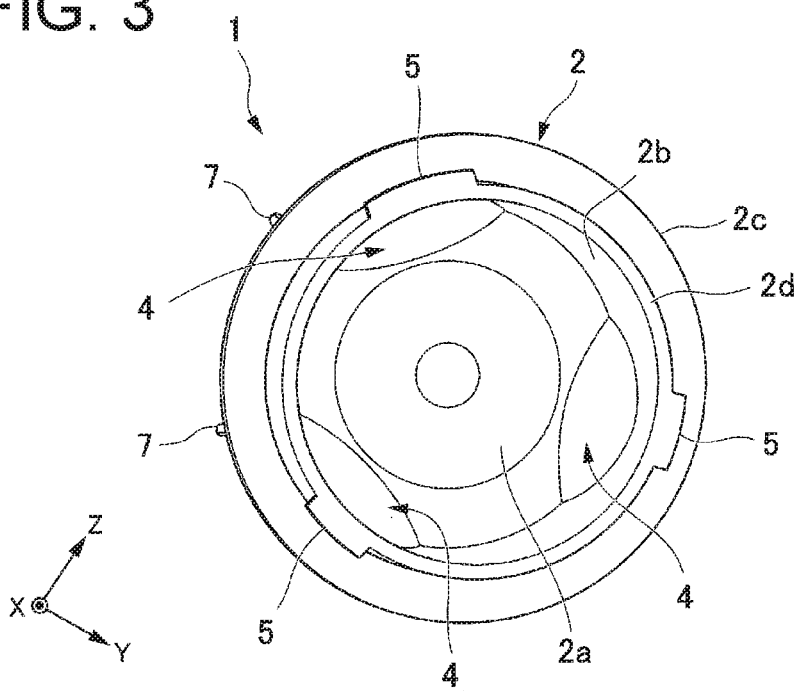
FIG. 3 is a perspective view of the cover member shown in FIG. 1 as viewed from the inner surface side.

As shown in FIGS. 2 and 3, the cover member 1 has a cover main body 2, a plurality of (three in this embodiment) recess portions 3 in which the outer surface of the cover main body 2 is recessed, and a plurality of (three in this embodiment) protrusion portions 4 projecting from the inner surface of the cover main body 2 corresponding to the respective recess portions 3.

The cover main body 2 is made of, for example, a molded body of a synthetic resin, and has a cap shape for closing the work hole 107. More specifically, the cover main body 2 includes a top wall portion 2a facing the work hole 107, a peripheral wall portion 2b surrounding the periphery of the top wall portion 2a, a flange portion 2c projected radially from the periphery of the peripheral wall portion 2b, and a front cylindrical portion 2d positioned forward of the flange portion 2c of the peripheral wall portion 2b (on the front surface side) and fitted into the work hole 107.

A plurality of claw portions 5 (three in this embodiment) are provided around the front cylindrical portion 2d so as to project outward. The plurality of claw portions 5 are provided as a fall-off and circumferential retainer for the work hole 107, which will be described later, and are arranged side by side at certain intervals (equally spaced in this embodiment) in the circumferential direction of the front cylindrical portion 2d. The positions and the lengths of the claw portions 5 in the circumferential direction are set in accordance with a plurality of notches (not shown) provided around the work hole 107.

The plurality of recess portions 3 are provided as gripping portions that allow one to grip the cover member 1, and are arranged on the outer surface of the peripheral wall portion 2b side by side in a circumferential direction at certain intervals (equally spaced in this embodiment) on the peripheral wall portion 2b. The position of each recess portion 3 coincides with the position of each claw portion 5 in the circumferential direction of the peripheral wall portion 2b.

Each recess portion 3 forms a concave surface curved from the outer circumferential side of the cover main body to the inner circumferential side when viewing the outer surface of the cover main body 2 in plan view. Each recess portion 3 also forms an inclined surface inclined in the diameter-expanding direction from the inner circumferential side to the outer circumferential side of the cover main body when the cover main body 2 is viewed in cross section in the axial direction (X-axis direction).

Knurled projections 6 that serve as anti-slip projections are provided on the surfaces of the respective recess portions 3 in the circumferential direction of the peripheral wall portion 2b. In addition, a pair of rib walls 7 are provided so as to protrude from both sides of the circumferential wall portion 2b sandwiching each of the recess portions 3.

The plurality of protrusion portions 4 are portions projecting toward the inside of the cover main body 2 from positions corresponding to the respective recess portions 3, and have a shape reflecting the respective recess portions 3. That is, the plurality of protrusion portions 4 are provided on the inner surface of the peripheral wall portion 2b so as to be arranged side by side at certain intervals (equally spaced in this embodiment) in the circumferential direction of the peripheral wall portion 2b.

Each protrusion portion 4 forms a convex surface curved from the outer circumferential side of the cover main body to the inner circumferential side when viewing the inner surface of the cover main body 2 in plan view. Each protrusion portion 4 forms an inclined surface inclined in the diameter-expanding direction from the inner circumferential side to the outer circumferential side of the cover main body when the cover main body 2 is viewed in cross section in the axial direction.

When the cover member 1 having the above-described configuration is mounted onto the work hole 107, the cover main body 2 is rotated by a predetermined angle on one side (right turn) in the circumferential direction while the cover member 1 is fit into the work hole 107 in the front cylindrical portion 2d with an O-ring (packing) 108 mounted around the front cylindrical portion 2d, as shown in FIG. 1.

At this time, the cover main body 2 is rotated to one side in the circumferential direction (clockwise) from the state in which the plurality of claw portions 5 are entering through the plurality of notches formed around the work hole 107, whereby the plurality of claw portions are stopped and retained to the work hole 107. Thus, the cover member 1 can be attached to the work hole 107.

On the other hand, the cover main body 2 is operated by a reverse operation relative to the above-described operation of attaching the cover member 1, that is, is rotated by a predetermined angle to the other side in the circumferential direction (counterclockwise) from a state in which the cover member 1 is attached to the work hole 107. Thus, the cover member 1 can be removed from the work hole 107 by matching the positions of the notches and the claw portions 5.

In the vehicular lamp 100 of the present exemplary embodiment, the cover member 1 can be easily grasped and rotated by providing a plurality of recess portions 3 (gripping portions) on the outer surface of the cover main body 2. As a result, it is possible to easily perform the attaching and detaching operation of the cover member 1 without securing a sufficient space on the rear surface side of the cover member 1.

In the vehicular lamp 100 of the present exemplary embodiment, the plurality of protrusion portions 4 projecting from the inner surface of the cover main body 2 form an inclined surface inclined in the diameter-expanding direction from the inner circumferential side toward the outer circumferential side of the cover main body 2. As a result, it is possible to prevent the wiring cords 104a and 104b from interfering with the protrusion portions 4 (inside the cover member 1) while a space for routing the wiring cords 104a and 104b is secured in the inside of the cover main body 2 (cover member 1) described above.

In recent years, particularly in a variable light distribution headlamp (ADB: Adaptive Driving Beam) for variably controlling the light distribution of the high beam light distribution pattern by arranging light emitting elements such as LEDs side by side and switching the lighting states of the light emitting elements, the number of wiring codes tends to increase, and therefore, it is particularly useful to adopt the cover member 1 of the present exemplary embodiment.

As described above, in the vehicular lamp 100 of the present exemplary embodiment, the attachment/detachment operation of the cover member 1 can be easily performed, and it is possible to prevent the wiring cords 104a and 104b from being damaged or the like while preventing the interference or the like between the inside of the cover member 1 and the wiring cords 104a and 104b.

The presently disclosed subject matter is not necessarily limited to the exemplary embodiments described above, and various modifications can be made thereon without departing from the spirit of the presently disclosed subject matter.

For example, in the exemplary embodiment described above, the case where the presently disclosed subject matter is applied to a headlamp for a vehicle has been exemplified, but the presently disclosed subject matter is not limited to vehicular lamps to be disposed on the front side described above, but can also be applied to rear side vehicular lamps such as a rear combination lamp.

In the light source unit 103, for example, a halogen lamp, an HID lamp, a laser diode (LD), or the like can be adopted in addition to the LED as the light source. The color of the light emitted by the light source is not limited to white light described above, and may be appropriately changed according to the use application of the light source, such as red light or orange light (amber light).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
   a light source unit;
   a housing having a front side and a rear side and inside of which the light source unit is disposed and which has a work hole formed therein on the rear side thereof wherein an axial direction is defined as a direction from the front side to the rear side; and
   a cover member detachably attached to the work hole of the housing, wherein
   the cover member includes a cover main body configured to close the work hole,
   the cover main body has a top wall portion facing the work hole and a peripheral wall portion surrounding a periphery of the top wall portion,
   a plurality of recess portions formed by concaving an outer surface of the cover main body are provided in the peripheral wall portion,
   a plurality of protrusion portions protruding from an inner surface of the cover main body are formed corresponding to the recess portions in the peripheral wall portion, and
   the protrusion portions each form a convex surface curved from the outer circumferential side toward the inner circumferential side of the cover main body when the inner surface of the cover main body is viewed in plan view, and also form an inclined surface inclined in a diameter-expanding direction perpendicular to the axial direction from an inner circumferential side toward an outer circumferential side of the cover main body when the cover main body is viewed in a cross-sectional view in the axial direction.

2. The vehicular lamp according to claim 1, wherein each one of the plurality of recess portions and a corresponding one of the plurality of protrusion portions defines a set to provide a plurality of sets of corresponding recess portions and protrusion portions, and the sets are arranged side by side in a circumferential direction of the peripheral wall portion.

3. The vehicular lamp according to claim 2, wherein the recess portion is a gripping portion that allows one to grip the cover member.

4. The vehicular lamp according to claim 3, wherein
   the cover main body includes a flange portion protruding from the periphery of the peripheral wall portion in the diameter-expanding direction, and a front cylindrical portion positioned forward of the flange portion of the peripheral wall portion and fitted into the work hole, and
   a plurality of claw portions serving as retainers for preventing the cover member from falling off the work hole are provided circumferentially side by side on the periphery of the front cylindrical portion.

5. The vehicular lamp according to claim 3, wherein
   the light source includes a light source unit having a wiring cord of a mounting board and a wiring cord of a circuit board which are electrically connected, and the wiring cords are located near the work hole.

6. The vehicular lamp according to claim 5, wherein
the wiring cords include a plug and a socket, respectively, to be electrically connected with each other, and
the plug and the socket connected with each other are located near the work hole.

7. The vehicular lamp according to claim 2, wherein
the cover main body includes a flange portion protruding from the periphery of the peripheral wall portion in the diameter-expanding direction, and a front cylindrical portion positioned forward of the flange portion of the peripheral wall portion and fitted into the work hole, and
a plurality of claw portions serving as retainers for preventing the cover member from falling off the work hole are provided circumferentially side by side on the periphery of the front cylindrical portion.

8. The vehicular lamp according to claim 2, wherein
the light source includes a light source unit having a wiring cord of a mounting board and a wiring cord of a circuit board which are electrically connected, and
the wiring cords are located near the work hole.

9. The vehicular lamp according to claim 8, wherein
the plurality of protrusion portions projecting from inner surface of the cover main body secure a space for routing the wiring cords in the inside of the cover main body.

10. The vehicular lamp according to claim 8, wherein
the wiring cords include a plug and a socket, respectively, to be electrically connected with each other, and
the plug and the socket connected with each other are located near the work hole.

11. The vehicular lamp according to claim 10, wherein
the wiring cords include a plug and a socket, respectively, to be electrically connected with each other, and
the plug and the socket connected with each other are located near the work hole.

12. The vehicular lamp according to claim 1, wherein
the cover main body includes a flange portion protruding from the periphery of the peripheral wall portion in the diameter-expanding direction, and a front cylindrical portion positioned forward of the flange portion of the peripheral wall portion and fitted into the work hole, and
a plurality of claw portions serving as retainers for preventing the cover member from falling off the work hole are provided circumferentially side by side on the periphery of the front cylindrical portion.

13. The vehicular lamp according to claim 12, wherein
the light source includes a light source unit having a wiring cord of a mounting board and a wiring cord of a circuit board which are electrically connected, and
the wiring cords are located near the work hole.

14. The vehicular lamp according to claim 13, wherein
the wiring cords include a plug and a socket, respectively, to be electrically connected with each other, and
the plug and the socket connected with each other are located near the work hole.

15. The vehicular lamp according to claim 1, wherein the vehicular lamp is configured as a vehicular headlamp.

16. The vehicular lamp according to claim 1, wherein
the light source includes a light source unit having a wiring cord of a mounting board and a wiring cord of a circuit board which are electrically connected, and
the wiring cords are located near the work hole.

17. The vehicular lamp according to claim 16, wherein
the wiring cords include a plug and a socket, respectively, to be electrically connected with each other, and
the plug and the socket connected with each other are located near the work hole.

18. The vehicular lamp according to claim 17, wherein
the wiring cords include a plug and a socket, respectively, to be electrically connected with each other, and
the plug and the socket connected with each other are located near the work hole.

19. The vehicular lamp according to claim 16, wherein
the plurality of protrusion portions projecting from the inner surface of the cover main body secure a space for routing the wiring cords in the inside of the cover main body.

* * * * *